Jan. 12, 1954   P. P. PECORA   2,665,693
INFANT TEETHING AND FEEDING DEVICE
Filed Aug. 9, 1952

INVENTOR.
PASQUO P. PECORA
BY
HIS ATTORNEYS

Patented Jan. 12, 1954

2,665,693

UNITED STATES PATENT OFFICE 2,665,693

INFANT TEETHING AND FEEDING DEVICE

Pasquo P. Pecora, West Hazleton, Pa., assignor to Pecora's Farm Dairy, West Hazleton, Pa., a partnership Application August 9, 1952, Serial No. 303,508

2 Claims. (Cl. 128—360)

The present invention relates to a teething and feeding device that is intended to be used by infants and is concerned primarily with certain novel, structural characteristics which facilitate getting certain types of nourishment into the infant.

At the present time, mothers, nurses and others whose duty it is to look after infants of tender years, experience considerable difficulty in getting the infant to take certain kinds of foods. This difficulty is particularly pronounced with scraped and crushed fruits and vitamin preparations.

Due to the fact that a large number of infants take their milk or formula from a nursing bottle, they are ordinarily familiar with the conventional rubber nipple and look upon this article with favor. The natural tendency of an infant upon getting hold of a rubber nipple is to place it in his mouth. The present invention proposes to take advantage of this familiarity in providing a teething and feeding device for infants.

An important object of the invention is to provide an infant's teething and feeding device which includes as an essential and characteristic element a rubber nipple that is adapted to contain any of a wide variety of food materials and which is formed with a plurality of openings through which either the food material itself or juices therefrom are extruded as pressure is applied thereto by the gum and/or teeth of the infant.

In providing a device of this character, it is highly important that the food material be confined within the rubber nipple and also that the device be susceptible of handling and manipulation by the infant. With this thought in mind, a further object is to provide a device of the character indicated which includes a carrier for the rubber nipple which is formed with a central opening through which the main body portion of the nipple passes. The nipple itself has an outwardly extending flange which engages the face of the carrier about the opening. The carrier is also formed with an internally threaded skirt and cooperating with this skirt is a handle member which is threaded thereinto and which carries a circular plate which engages the nipple flange to clamp it against the carrier. This plate serves to confine any food material within the nipple and also cooperates with the carrier to clamp the flange of the nipple so as to securely hold the latter in place.

The handle preferably takes the form of a bail which is adapted to carry certain elements which are amusing to the infant and are attractive to him. Thus, the handle may carry a plurality of colored balls which are movable therealong, elements of a rattle, or similar devices.

Various other more detailed objects and advantages of the invention, such as arise in connection with carrying out the above noted ideas in a practical embodiment, will in part become apparent and in part be hereinafter stated, as the description of the invention proceeds.

The invention therefore comprises an infant's teething and feeding device which consists essentially of a rubber nipple having an outstanding flange at its open end, a carrier having a central opening receiving the nipple, and an internally threaded skirt and a handle comprising a bail and a cup shaped member that is threaded into the skirt and has a plate which clampingly engages the flange of the nipple.

For a full and more complete understanding of the invention, reference may be had to the following description and accompanying drawing wherein.

Figure 1:
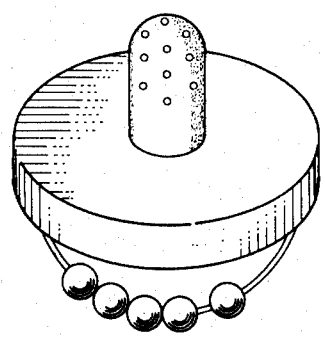
Figure 1 is a perspective view of an infant's teething and feeding device which is designed in accordance with the precepts of this invention.
Figure 2:
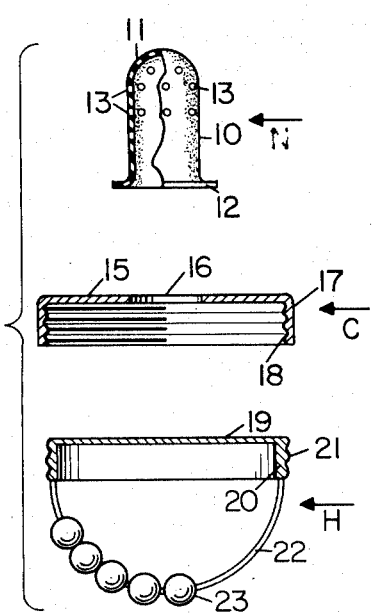
Figure 2 is a side view partly in section and partly in elevation illustrating the several elements of the device in exploded relation.
Figure 3:
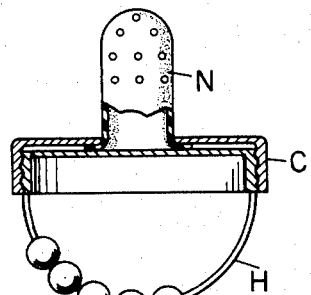
Figure 3 is another side view partly in section and partly in elevation showing the device as assembled.

Referring now to the drawing wherein like reference characters denote corresponding parts and first more particularly to Figure 2, the teething and feeding device of this invention is shown as comprising three main elements. These are: a nipple which is referred to in its entirety by the reference character N, a carrier which is generally identified as C, and a handle which is designated H.

The nipple N is made of rubber or appropriate rubber composition having desired properties of flexibility, resiliency, and elasticity. This nipple N comprises a main body portion 10 of generally cylindrical formation which is closed at one end by the rounded dome shape end portion 11, while the other end is open. At this open end there is an outwardly extending flange 12. Both the main body portion 10 and the curved end portion 11 have a plurality of small apertures 13 through which various food materials or juices therefrom are adapted to be extruded when pressure is applied to the nipple in a well-known manner.

At this point, it is well to note that the nipple

N is intended to contain any of a wide variety of food materials. Among such materials which might be noted are scraped fruit such as scraped apples, crushed fruit such as crushed bananas, pastry such as bread or cake, and vitamin preparations which are put out by drug houses. In this connection, it is notable that such preparations might be prepared by the manufacturer to accurately conform to the shape of the nipple.

The carrier C is of generally cup shaped formation and comprises a flat disc-like plate 15 that is formed with a central opening 16 which has substantially the same diametric dimension as the main body portion 10 of the nipple N. Integrally joined to the plate 15 and depending therefrom is a cylindrical skirt 17 that is internally threaded as indicated at 18. In assembling the device, the nipple N is first inserted through the opening 16 so that the main body portion 10 is received in the opening while the flange 12 engages the inner face of the disc 15 about the opening 16.

The handle H comprises a cup shaped member defined by a flat imperforate disc-like plate 19 and a skirt 20 that is externally threaded as indicated at 21. A bail 22 has its ends secured to this skirt 20 in any preferred manner and the bail 22 may carry any sort of device which might prove to be attractive to an infant. The balls shown at 23 are intended as illustrative of one such amusement device. Obviously, such things as the elements of a rattle could also be carried by the bail 22.

While it is believed essential that the nipple be made of rubber, there is a wide variety of materials which might be employed in manufacturing the carrier C and the handle H. Sheet metal or any of a large number of plastics are suitable for this purpose.

*Operation*

While the manner of using the infant teething and feeding device above described is believed to be obvious from the illustration of the drawing and description of parts given, it may be briefly outlined as follows.

The nipple is first filled with the appropriate food and this filling operation may take place either before the nipple is assembled in the carrier C or after it has been so assembled. The handle H is then positioned so that the threads 21 may be screwed into the threads 18. This operation is continued until the flange 12 of the nipple is squarely clamped between the discs 15 and 19. In this position the imperforate plate 19 closes the open end of the nipple and confines the food material therein.

The device is now given to the infant and when he places the nipple in his mouth and chews on it, the food material and/or juices therefrom will be extruded through the openings 13.

While a preferred specific embodiment of the invention is hereinbefore set forth, it is to be clearly understood that the invention is not to be limited to the exact constructions, materials, and arrangements illustrated and described, because various modifications of these details may be provided in putting the invention into practice within the purview of the appended claims.

What is claimed is:

1. In an infant teething and feeding device, a rubber nipple having a main body portion, a closed end, and an open end with a flange extending outwardly from the main body portion at said open end; said main body portion and closed end being formed with apertures through which food is adapted to be extruded; a disc-like plate having a downwardly depending peripheral skirt and being provided with a central opening adapted to receive said nipple with the flange thereof lying adjacent to the underside of said plate; the said skirt being provided with threads on the inside surface thereof; a second disc-like plate having a downwardly depending peripheral skirt with threads on the outside surface thereof; the said plates lying in a substantially adjacent relationship with the nipple flange therebetween in clamped fashion, and their respective skirts in threaded engagement; a bail carried by one of said skirts providing a convenient gripping means; and an amusement device mounted on said bail to entice the infant into using said nipple.

2. In an infant teething and feeding device, a rubber nipple having a main body portion, a closed end, and an open end with a flange extending outwardly from the main body portion at said open end; said main body portion and closed end being formed with apertures through which food is adapted to be extruded; a disc-like plate having a downwardly depending peripheral skirt and being provided with a central opening adapted to receive said nipple with the flange thereof lying adjacent to the underside of said plate; the said skirt being provided with threads on the inside surface thereof; a second disc-like plate having a downwardly depending peripheral skirt with threads on the outside surface thereof; the said plates lying in a substantially adjacent relationship with the nipple flange therebetween in clamped fashion, and their respective skirts in threaded engagement; a bail carried by one of said skirts providing a convenient gripping means; and a plurality of colored balls mounted on said bail to entice the infant into using said nipple.

PASQUO P. PECORA.

References Cited in the file of this patent

UNITED STATES PATENTS

| Number | Name | Date |
|---|---|---|
| 1,070,430 | Dunn | Aug. 19, 1913 |

FOREIGN PATENTS

| Number | Country | Date |
|---|---|---|
| 536,196 | Great Britain | May 6, 1941 |
| 811,133 | Germany | Aug. 16, 1951 |